United States Patent
Hansson et al.

(10) Patent No.: US 11,943,009 B2
(45) Date of Patent: Mar. 26, 2024

(54) COMMUNICATION BARRIER ARRANGEMENT AND METHOD FOR ITS OPERATION

(71) Applicant: ABB Schweiz AG, Baden (CH)

(72) Inventors: Ulf Hansson, Västerås (SE); Thomas Keul, Freigericht (DE); Johan Wennerberg, Västerås (SE)

( * ) Notice: Subject to any disclaimer, the term of this patent is extended or adjusted under 35 U.S.C. 154(b) by 63 days.

(21) Appl. No.: 17/810,381

(22) Filed: Jul. 1, 2022

(65) Prior Publication Data

US 2023/0010364 A1 Jan. 12, 2023

(30) Foreign Application Priority Data

Jul. 8, 2021 (EP) ..................................... 21184395

(51) Int. Cl.
  *H04B 5/00* (2006.01)
(52) U.S. Cl.
  CPC .................................... *H04B 5/005* (2013.01)
(58) Field of Classification Search
  CPC ....... H04B 5/005; H04B 3/00; H04L 25/0266; H04L 63/02; H04L 67/12; H02M 1/08; H02M 1/32
  See application file for complete search history.

(56) References Cited

U.S. PATENT DOCUMENTS

| | | | | |
|---|---|---|---|---|
| 9,787,195 B1* | 10/2017 | Xiong | ............... | H02M 3/33507 |
| 10,651,752 B1* | 5/2020 | Liu | .......................... | H02M 1/08 |
| 11,552,619 B2* | 1/2023 | Barot | ................. | H03K 3/02337 |
| 2002/0150156 A1* | 10/2002 | Calvin | .................... | H04L 27/10 |
| | | | | 375/258 |
| 2008/0180226 A1* | 7/2008 | Schmidt | ............ | G05B 19/0428 |
| | | | | 340/286.01 |
| 2022/0038079 A1* | 2/2022 | Barot | ...................... | H02M 1/15 |
| 2022/0051845 A1* | 2/2022 | Cantrell | ................. | H02H 9/008 |

FOREIGN PATENT DOCUMENTS

| | | | | |
|---|---|---|---|---|
| EP | 1883179 A1 * | 1/2008 | ............ | H04L 12/10 |
| EP | 1883179 A1 | 1/2008 | | |
| WO | 2020223213 A1 | 11/2020 | | |

OTHER PUBLICATIONS

Extended European Search Report; Application No. 21184395.8; Completed: Dec. 6, 2021; dated Dec. 14, 2021; 9 Pages.

* cited by examiner

*Primary Examiner* — Jared Fureman
*Assistant Examiner* — Michael J Warmflash
(74) *Attorney, Agent, or Firm* — Whitmyer IP Group LLC

(57) ABSTRACT

A communication barrier arrangement includes a first driver having a first interface for receiving signals from a first device destined for a second device, an isolation barrier including a first transformer for signal transfer and having a primary winding connected to the first driver and a secondary winding, a second driver connected to the secondary winding and having a first connection terminal for output of the signals towards the second device, a first signal conditioner having a second connection terminal for receiving the signals from the second driver and a second interface for delivering them to the second device and a protection circuit including a resistor in parallel with a first capacitor, the protection circuit being connected between the first and second connection terminals.

15 Claims, 4 Drawing Sheets

COMMUNICATION BARRIER ARRANGEMENT AND METHOD FOR ITS OPERATION

TECHNICAL FIELD

The present disclosure relates to a communication barrier arrangement and to a method of operating such a communication barrier arrangement.

BACKGROUND

Isolation barriers may be needed in different situations, such as in process control systems, like when communication is to be made between a safe and a hazardous environment. Isolation barriers are typically set up using transformers.

One type of isolation barrier is described in US 2002/0150156, where two active driving stages are placed on opposite sides of two transformers, where a first transformer is used for the transfer of signals in one direction and the other is used for the transfer of signals in the opposite direction.

When placing such an isolation barrier in a hazardous environment, the voltage experienced by the isolation barrier may become dangerously high. There therefore exists a need for protecting the isolation barrier and more particularly for protecting the transformers of the isolation barrier.

SUMMARY

One object of the present disclosure is to provide a communication barrier arrangement comprising an isolation barrier that is protected from dangerous voltages caused by a hazardous environment.

According to a first aspect this problem is addressed by an isolation barrier arrangement for connection between a first and a second process control system device, where the communication barrier arrangement comprises:
- a first driving stage having a first interface for receiving first signals from the first process control system device that are destined for the second process control system device;
- an isolation barrier comprising a first transformer having a primary winding connected to the first driving stage and a secondary winding, where the first transformer is provided for transfer of the first signals;
- a second driving stage connected to the secondary winding of the first transformer and having a first connection terminal for output of the first signals towards the second process control system device;
- a first signal conditioner having a second connection terminal for receiving the first signals from the second driving stage and a second interface for delivering the first signals to the second process control system device; and
- a protection circuit comprising a resistor in parallel with a first capacitor, the protection circuit being connected between the first and second connection terminals.

The signals on the first connection terminal may comprise at least one zero voltage level. In this case, the first signal conditioner may be configured to detect such a zero-voltage level and pull the voltage at the second connection terminal to zero in order to discharge the first capacitor.

The detection may be carried out through comparing the voltage at the second connection terminal with a threshold and pulling the voltage at this connection terminal to zero if detecting that the threshold is being crossed.

The threshold may be a threshold below a signal level of the first signals provided at the second connection terminal, such as at a fraction of the signal level, for instance at % of the signal level.

A signal connection between the first and second connection terminals that passes through the protection circuit may additionally be the only signal connection between the second driving stage and the first signal conditioner.

It is additionally possible that the first driving stage is an active driving stage, and the second driving stage is a passive driving stage, where an active driving stage is a driving stage that requires an external power supply voltage, while a passive driving state does not.

The second driving stage may additionally comprise a first transistor with a base or gate connected to the secondary winding of the first transformer, a collector or drain connected to the first connection terminal and an emitter or source connected to ground.

It is furthermore possible that a rectifier is connected between the secondary winding of the first transformer and the first transistor.

It is additionally possible that:
- the isolation barrier comprises a second transformer having a primary winding connected to the first driving stage and a secondary winding, where the second transformer is provided for transfer of second signals,
- the second driving stage is connected to the secondary winding of the second transformer,
- the second interface of the first signal conditioner is provided for receiving the second signals from the second process control system device that are destined for the first process control system device,
- the second connection terminal of the first signal conditioner is provided for transmitting the second signals to the second driving stage,
- the first connection terminal of the second driving stage is provided for reception of the second signals from the second process control system device, and
- the first interface of the first driving stage is provided for delivering the second signals to the first process control system device.

When there is a second transformer for transferring the second signals, the second driving stage may comprise a switch in parallel with the secondary winding of the second transformer, which switch is operated using the second connection terminal. It is possible that a first binary value of the second signals corresponds to a signal level voltage at the second connection terminal and that a second binary level of the second signals corresponds to a zero-level voltage at the second connection terminal. Thereby the first binary value closes the switch, while the second binary value opens the switch.

The switch may comprise a second transistor with the drain and source, or collector and emitter connected to the secondary winding of the second transformer and the gate or base connected to the first connection terminal.

The operation of the second driving stage may be the coding of the second signals into the impedance of the second transformer as seen from the primary winding of the second transformer.

For this reason, the first driving stage may comprise an impedance detector connected to the primary winding of the second transformer and a second signal conditioner configured to generate pulses recreating the second signals based on changes in the detected impedance.

The first driving stage may additional comprise a first coding circuit connected to the primary winding of the first transformer, which first coding circuit may be configured to code the first signals into a carrier having a carrier frequency and to convey the carrier with the coded first signals to the signal conditioner via the first transformer, the second driving stage and the protection circuit, where the first signal conditioner is configured to extract the first signals from the carrier.

The coding may be a logical combining of the first signals with the carrier which logical combining may be an AND or a NOR operation.

The first driving stage may additionally comprise a second coding circuit connected to the primary winding of the second transformer, which second coding circuit inverts the carrier and provides the inverted carrier to the second transformer.

There may also be a second capacitor connected in parallel with the primary winding of the second transformer, which second capacitor has a value selected to tune the resonance frequency of the second transformer to the carrier frequency.

According to a second aspect the above-mentioned problem is addressed by a method of operating a communication barrier arrangement that comprises an isolation barrier with a first and a second transformer and a protection circuit for the isolation barrier, the protection circuit comprising a resistor connected in parallel with a first capacitor, the protection circuit having a first side at one end of the parallel components, which first side faces the isolation barrier, and having a second side at an opposite end of the parallel components, the method comprising:

receiving first signals from a first process control system device, transferring the first signals to a second process control system device via the first transformer and the protection circuit, detecting a zero-voltage level at the first side of the protection circuit, and pulling the voltage at the second side of protection circuit to zero in order to discharge the first capacitor.

The method may additionally comprise coding, in a first driving stage, the first signals into a carrier, where the transferring of the first signals comprises conveying the carrier with the coded first signals to a first signal conditioner via the first transformer and extracting, in the signal conditioner, the first signals from the carrier. The coding may be a logical combining, such as the logical combining of an AND or a NOR operation.

The method may additionally comprise receiving second signals from the second process control system device and transferring the second signals to the first process control system device via the protection circuit and the second transformer.

The transferring of the second signals may be made through coding the second signals into the impedance of the second transformer, which coding may additionally be a coding as impedance variations of the second transformer as seen from the primary winding of the second transformer.

The transferring of the second signals may in this case comprise detecting, at the primary winding of the second transformer, the impedance of the second transformer and recreating the second signals based on changes in the detected impedance.

The second signals may be binary with a first and second value and the communication barrier arrangement may comprise a switch in parallel with the secondary winding of the second transformer.

In this case the method may further comprise closing the switch when the first binary value of the second signal appears at the first side of the protection circuit and opening the switch when the second binary value of the second signal appears at the first side of the protection circuit, thereby coding the second signals as impedance variations of the second transformer.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
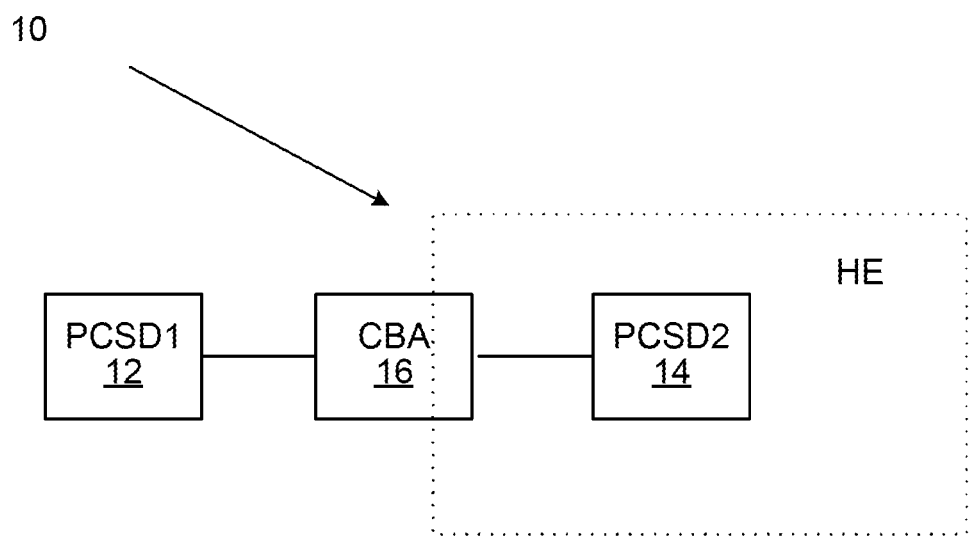
FIG. 1 schematically shows a simplified process control system where a first process control system device communicates with a second process control system device via a communication barrier arrangement.

In the following, a communication barrier arrangement will be described. The same reference numerals will be used to denote the same or similar structural features.

In a process control system, it may be necessary for a first process control system device to communicate with a second process control system device via a communication barrier arrangement that isolates the first process control system device from the second process control system device. This may for instance be the case if the second process control system device is provided in an environment from which the first process control system device needs to be isolated, for instance if the environment in which the second process control system device is provided is hazardous. One example of a hazardous environment is an explosive environment.

FIG. 1 schematically shows a simplified process control system 10 comprising such a first process control systems device PCSD1 12 that communicates with a second process control system device PCSD2 14 via a communication barrier arrangement CBA 16, where the second process control system device 14 and parts of the communication barrier arrangement 16 are provided in a hazardous environment HE. The first process control system device 12 may for instance be a controller such as a microcontroller and the second process control system device 14 may be field device, such as an IO (Input Output) device. It may also be realized as a microcontroller. The communication barrier arrangement 16 may as an example be an intrinsically safe IO module, for instance for Ex environments according to IEC 60079-11.

Figure 2:
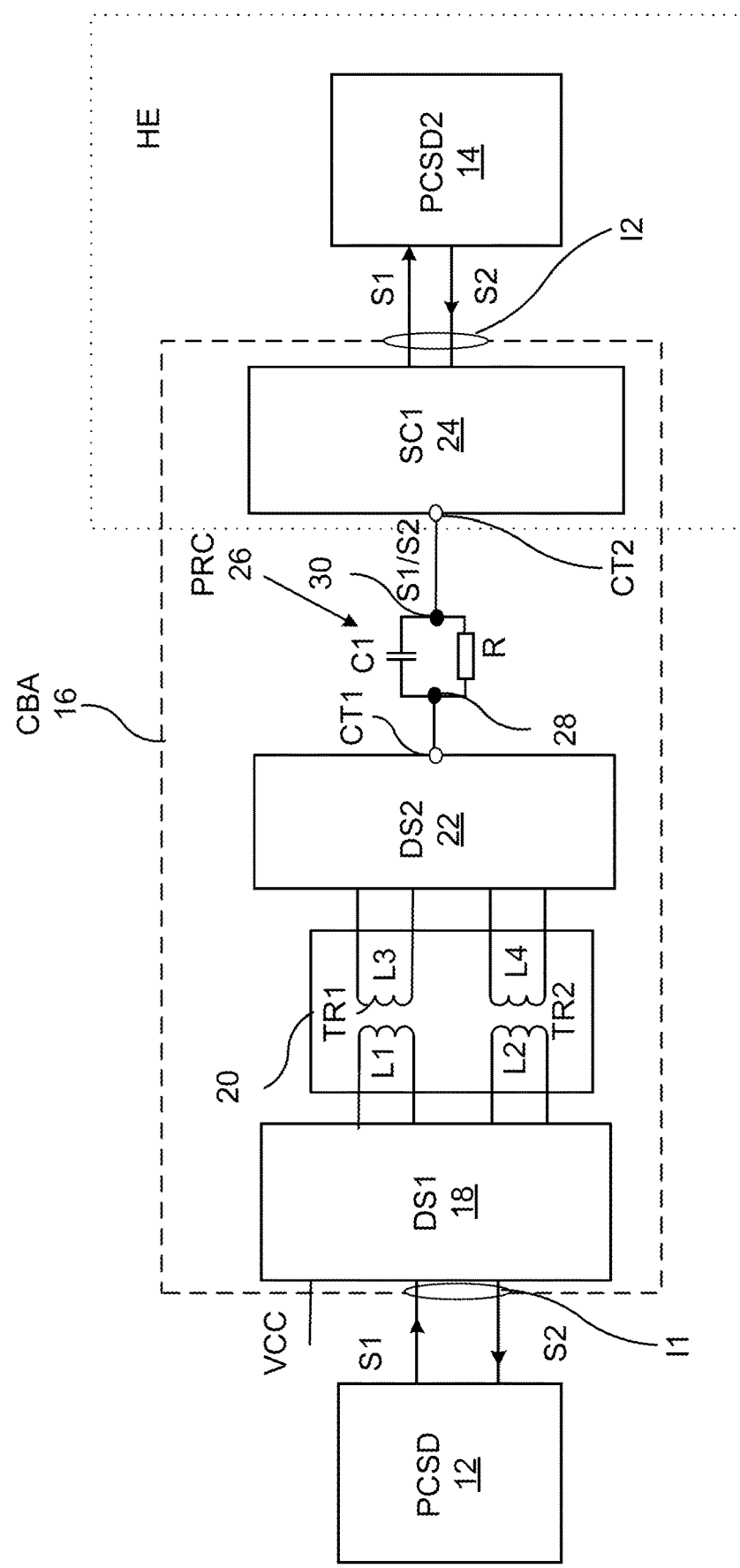
FIG. 2 schematically shows the first process control system device communicating with the second process control system device via a more detailed communication barrier arrangement that comprises a protection circuit having a first and a second end.

FIG. 2 schematically shows the first process control system device 12, the second process control system device 14 as well as a more detailed communication barrier arrangement 16.

The communication barrier arrangement 16 comprises a first driving stage DS1 18, an isolation barrier 20, a second driving stage DS2 22, a protection circuit PRC 26 and a first signal conditioner SC1 24.

The first driving stage 18 has a first interface I1 for connection to the first process control system device 12. The first driving stage 18 is also connected to the isolation barrier 20. The isolation barrier 20 has a primary and a secondary side, where the primary side is connected to the first driving stage 18 and the secondary side is connected to the second driving stage 22.

The isolation barrier 20 comprises a first and a second transformer TR1 and TR2, where each transformer has a primary and a secondary winding L1, L2, L3, L4. The first driving stage 18 is connected to the primary winding L1 of the first transformer TR1 and to the primary winding L2 of the second transformer TR2. The second driving stage 22 is in turn connected to the secondary winding L3 of the first transformer TR1 and to the secondary winding L4 of the second transformer TR2.

The second driving stage 22 has a first connection terminal CT1 for output of the first signals towards the second process control system device 14 and for reception of the second signals S2 from the second process control system device. The first connection terminal CT1 is interconnected with a second connection terminal CT2 of the first signal conditioner 24 via the protection circuit 26. The first signal conditioner 24 thereby has a second connection terminal CT2 for receiving the first signals S1 from the second driving stage 22 as well as for transmitting the second signals S2 to the second driving stage 22. The first signal conditioner 24 also has a second interface I2 for delivering the first signals S1 to the second process control system device 14 as well as for receiving the second signals S2 that are destined for the first process control device 12.

As can be seen above, the protection circuit 26 is connected between the first and second connection terminals CT1 and CT2. These connection terminals may be the only connection terminals of the second driving stage 22 and the first signal conditioner 24. Thereby, the signal connection between the first and second connection terminals CT1 and CT2 that passes through the protection circuit 26 may be the only signal connection between the second driving stage 22 and the first signal conditioner 24.

The protection circuit 26 comprises two components, a resistor R and a first capacitor C1, where the resistor R is connected in parallel with the first capacitor C1. The protection circuit 26 also has a first side 28 that is connected to the first connection terminal CT1 and thereby the first side 28 faces the isolation barrier 20. The protection circuit 26 also has a second side 30 at an opposite end of the parallel components and this second side 30 is connected to the second connection terminal CT2.

The first communication interface 11 receives first signals S1 from the first process control system device 12 that are destined for the second process control system device 14 as well as delivers second signals S2 to the first process control system device 12, where the second signals S2 originate in the second process control system device 14.

In an analogous manner, the second interface I2 receives the second signals S2 from the second process control system device 14 and delivers the first signals S1 to the second process control system device 14, where the first signals S1 thus originate in the first process control system device 12. The first signals S1 may be universal asynchronous receiver-transmitter (UART) signals, while the second signals S2 may be logic level signals, such as transistor-transistor logic (TTL) level signals.

In the isolation barrier 20, the first transformer TR1 is provided for transfer of the first signals S1 and the second transformer TR2 is provided for transfer of the second signals S2.

In the second driving stage 22 the first connection terminal CT1 is provided for output of the first signals S1 towards and reception of the second signals S2 from the second process control system device 14. In the first signal conditioner 24, the second connection terminal CT2 is provided for receiving the first signals S1 from and transmitting the second signals S2 to the second driving stage 22. The first signal conditioner 24 may additionally have a pull up resistor connected to the second connection terminal CT2 for providing a signal level voltage that can be used for outputting the second signals S2. The first signal conditioner 24 may furthermore comprise processing logic for influencing the voltage on the second connection terminal CT2. It may for this reason be realized as a field-programmable gate array (FPGA) for implementing an UART interface. However, it should be realized that other realizations are also possible, such as an application specific integrated circuit (ASIC).

According to aspects of the present disclosure, the first driving stage 18 is an active driving stage, and the second driving stage 22 is a passive driving stage, meaning that the first driving stage 18 needs to be supplied with power for its operation, while the second driving stage 22 does not need such power. This is in FIG. 2 indicated through the first driving stage 18 being connected to a power supply voltage VCC, while the second driving stage 22 has no such power supply.

The isolation barrier 20 is designed for providing isolation according to the field of application. Thereby the primary and secondary windings of the first and second transformers TR1 and TR2 may be separated by insulation of a thickness that is suitable for the field of application. In the case of use in Ex environments, the insulation may as an example be thicker than 1.o mm.

In some such hazardous environments, the isolation barrier 20 may be subjected to a hazardous voltage, which is typically a high enough voltage to be harmful. It is thereby of interest to protect the isolation barrier 20 and especially the transformers TR1 and TR2 of the isolation barrier 20. The protection circuit 26 is provided for this reason. A properly designed protection circuit 26 may provide reliable protection of the isolation barrier 20.

This protection circuit 26 may need to have a fairly large resistance, such as a resistance of above 40 kΩ. Furthermore, the operation may lead to the first capacitor C1 being charged. This charging may affect the first signals S1 when they enter the first signal conditioner 24.

Figure 3:
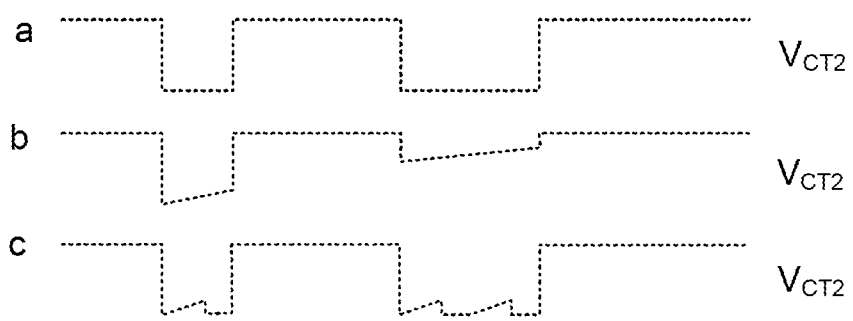
FIG. 3 schematically shows voltages at the second end of the protection circuit.

This effect is schematically shown in curve b of FIG. 3, which shows the voltage $V_{CT2}$ at the second connection terminal CT2 when there is a protection circuit, as compared with a corresponding ideal voltage $V_{CT2}$ when there is no protection circuit shown in curve a. The voltage at the second connection terminal CT2 is also the voltage at the second end 30 of the protection circuit 26.

The use of a large resistor R leads to the first capacitor C1 being charged without a following discharge. The first capacitor C1 may thus be saturated. Thereby, the information in the signal S1 may become impossible to decode by the first signal conditioner 24.

Aspects of the present disclosure are directed towards allowing the signals to be detected at the same time as the isolation barrier 20 is protected.

Figure 4:
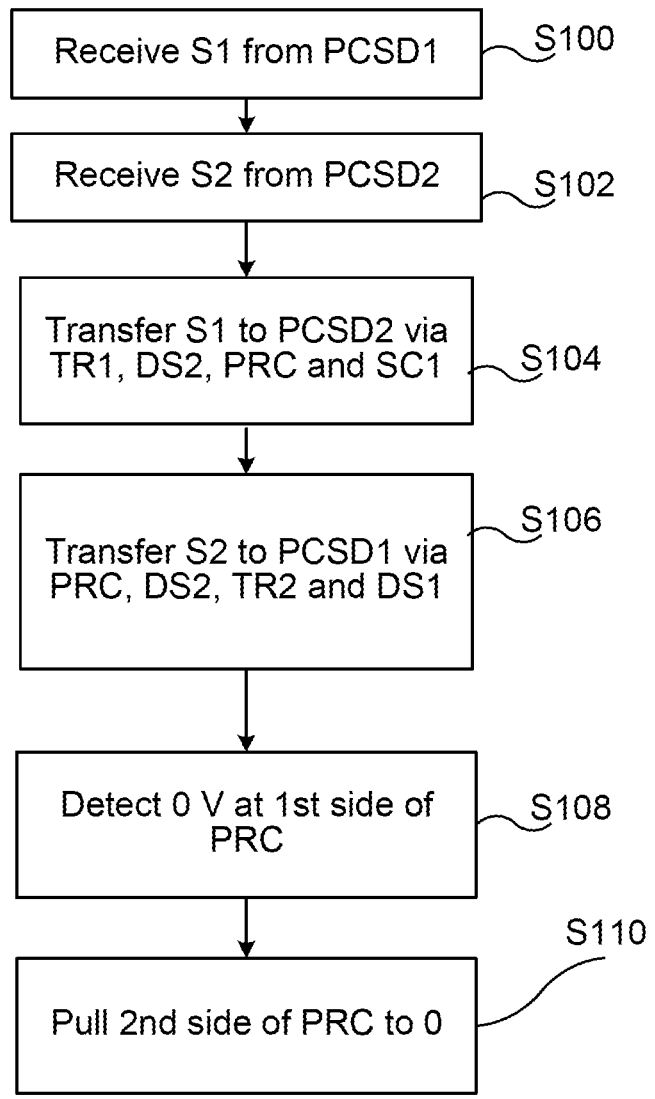
FIG. 4 schematically shows a number of method steps in a method of operating the communication barrier arrangement.

How this can be done will now also be disclosed with reference being made to FIG. 4, which shows a flow chart of a number of method steps in a method of operating the communication barrier arrangement 16.

In the method, the first driving stage 18 receives the first signals S1 from the first process control system device 12, S100, and the first signal conditioner 24 receives the second signals S2 from the second process control system device 14, S102. The first and second signals S1 and S2 are then transferred through the communication barrier arrangement 16. The first driving stage 18 thus transfers the first signals S1 to the second process control system device 14 via the first transformer TR1, the second driving stage 22, the protection circuit 26 and the first signal conditioner 24, step S104. The first signal conditioner 24 in turn transfers the second signals S2 to the first process control system device 12 via the protection circuit 26, the second driving stage 22, the second transformer TR2 and the first driving stage 18, S106.

In order to enable signal level detection, the first signal conditioner 24 may investigate the voltage at the first connection terminal CT1, which is also an investigation of the voltage at the first side 28 of the protection circuit 26.

The signals on the first connection terminal CT1 may comprise at least one zero voltage level.

If now the first signal conditioner 24 detects that there is supposed to be a zero-voltage level at the first side 28 of the protection circuit 28, S108, i.e. at the first connection terminal CT1, the first signal conditioner 24 pulls down the voltage at the second side 30 of the protection circuit 26 to zero, S110. This pulling down is made through giving the second connection terminal CT2 a zero voltage, for instance through grounding the second connection terminal CT2. The pulling down may be made at the same time as the first connection terminal has the zero-voltage and thereby the first capacitor C1 will be discharged.

It is additionally possible that the monitoring is made on the second side of the protection circuit 26, i.e. at the second connection terminal CT2. In this case the first signal conditioner 24 may compare the voltage $V_{CT2}$ at the second connection terminal CT2 with a threshold and pull this voltage $V_{CT2}$ down to zero if the threshold is exceeded. The detection may thus be carried out through comparing the voltage at the second connection terminal CT2 with the threshold and pulling the voltage at this connection terminal to zero if detecting that the threshold is being crossed, i.e. that the voltage passes the threshold. Once the discharge is complete, the voltage may be allowed to rise again until the threshold is again crossed. The threshold may be a threshold below the signal level provided through the use of the pull-up resistor, such as at a fraction of the signal level, for instance at ¼ of the signal level.

How this can be carried out can be seen in curve c in FIG. 3, where it can also be seen that as soon as the voltage $V_{CT2}$ at the second connection terminal CT2 has reached the threshold, the voltage is pulled down, which occurs when the voltage at the first connection terminal CT1 is zero but the first capacitor C1 has a charge corresponding to the threshold. The voltage is thus forcibly pulled down to zero and thereby the first capacitor C1 is discharged. It can also be seen that it is possible that there are several such discharging cycles in a period of time when the first connection terminal CT1 has a zero voltage.

Thereby it is possible to protect the isolation barrier 20 while at the same time enable detection of the first signals S1.

Now aspects of the communication barrier arrangement will be described, where more details about the way that the signals may be transferred will be given.

Figure 5:
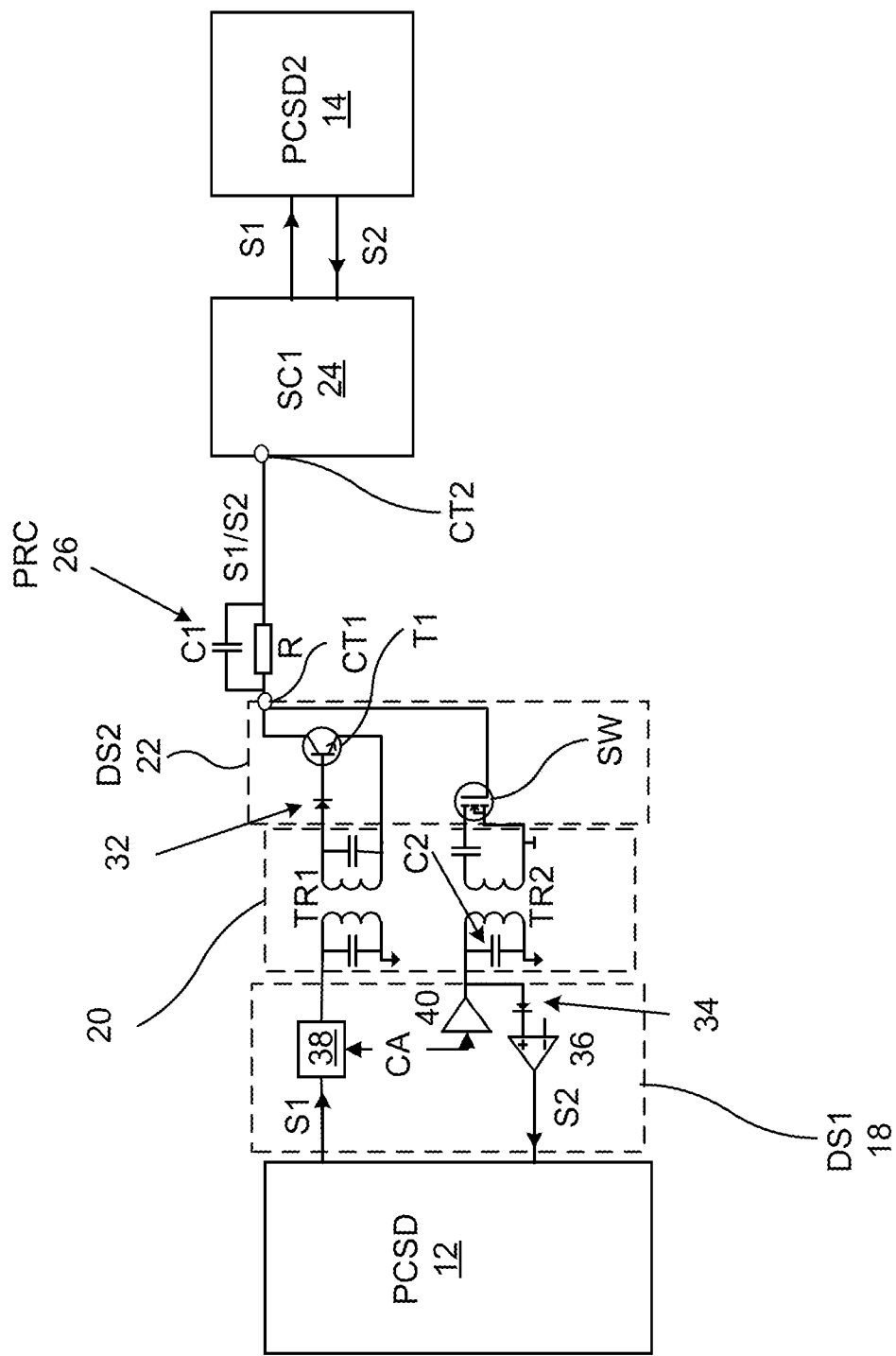
FIG. 5 schematically shows the communication barrier arrangement in some further detail.

FIG. 5 schematically shows more details of the communication barrier arrangement 16.

The first driving stage 18 comprises a first coding circuit 38 connected to the primary winding L1 of the first transformer TR1. The first coding circuit 38 codes the first signals S1 into a carrier CA having a carrier frequency and conveys the carrier CA with the coded first signals S1 to the first signal conditioner 24 via the first transformer TR1, the second driving stage 22 and the protection circuit 26. The signal conditioner 24 in turn extracts the first signals S1 from the carrier CA.

The coding may be a logical combining of the first signals S1 with the carrier. The first coding circuit 38 may thereby be a first logical circuit that may be a NOR gate performing a logical NOR operation on the first signals S1 and the carrier CA, which in this case is a high-frequency carrier, such as a high-frequency square wave. This means that the output of the first coding circuit 38 is a number of pulses of the carrier or a zero-voltage depending on the signs of the first signals S1. Here it should be realized that the first coding circuit may just as well be an AND gate that performs a logical AND operation.

The method may therefore additionally comprise coding, in the first driving stage 18, the first signals S1 into a carrier CA, where the transferring of the first signals comprises conveying the carrier CA with the coded first signals S1 to the first signal conditioner 24 via the first transformer TR1 and extracting, in the signal conditioner 24, the first signals S1 from the carrier CA.

It can also be seen that the second driving stage 22 comprises a first transistor T1 connected to the first connection terminal CT1. The first transistor T1 has a base or gate connected to the secondary winding L3 of the first transformer TR1, a collector or drain connected to the first connection terminal CT1 and an emitter or source connected to ground. In the present example the transistor is a bipolar transistor, why it has a gate, emitter and collector oriented in the above-mentioned way.

There is also a rectifier 32 connected between the secondary winding L3 of the first transformer TR1 and the first transistor T1. The rectifier 32 is with advantage realized using one or more diodes.

As the first transformer TR1 is connected to the protection circuit 26 via a diode rectifier and a first transformer with the above-mentioned orientation, the second driving stage 22 can transfer the carrier with the modulated first signals to the first signal conditioner 24 without the use of a power supply voltage.

In order to transfer the second signals S2 to the first driving stage 18, the second driving stage 22 comprises a switch SW in parallel with the secondary winding L4 of the second transformer TR2, which switch SW is operated using the second connection terminal CT2. The switch SW is thus operated without the use of an external power supply. Thereby also the second signals S2 can be transferred by the second driving stage 22 without the use of an external power supply.

An impedance detector 34 is also connected to the primary winding L2 of the second transformer TR2 and a second signal conditioner 36 is connected to the impedance detector 34. The impedance detector may be realized as a diode. The second signal conditioner 36 may be realized as a comparator that compares a detected impedance with an impedance threshold and outputs binary pulses based on the comparison, which binary pulses recreate the second signals. It may output one binary value if the detected impedance is above the threshold and another if the impedance is below the threshold.

The transferring of the second signals S2 is in this case made through coding the second signals S2 into the impedance of the second transformer TR2 as impedance variations of the second transformer TR2, where this impedance is the impedance as seen from the primary winding L2 of the second transformer TR2. In the method the communication barrier arrangement 16, and in this case the second driving stage 22, codes the second signals S2 into the impedance of the second transformer TR2, which coding may be a coding as impedance variations of the second transformer TR2 as seen from the primary winding L2 of the second transformer TR2. In the first driving stage 18, the impedance of the second transformer TR2 is then detected at the primary winding L3 and the second signal S2 recreated based on the changes in the detected impedance. The signal is more particularly recreated through the comparing of the measured impedance with the impedance threshold.

In order to perform the coding, the second signals S2 at the second connection terminal CT2 are binary with a first and second value, where the signals are applied to the switch SW via the first connection terminal CT1. It is possible that a first binary value of the second signals corresponds to a signal level voltage at the second connection terminal CT2 and that a second binary level of the second signals corresponds to a zero-level voltage at the second connection terminal. The switch SW is then closed when the first binary value appears on the first connection terminal CT1 and opened when the second binary value appears on the first connection terminal CT1, thereby coding the second signals S2 as impedance variations of the second transformer TR2.

Furthermore, the first binary value may correspond to a signal level voltage at the second connection terminal CT2 of the first signal conditioner 24 and the second binary level may correspond to a zero-level voltage at the second connection terminal CT2 of the first signal conditioner 24. The switch SW may additionally be realized as a second transistor with the drain and source or collector and emitter connected to the secondary winding L4 of the second transformer TR2 and the gate or base connected to the first connection terminal CT1. In the present case the second transistor is an open drain metal-oxide-semiconductor field-effect transistor (MOSFET) transistor, why it is the drain, source and gate that have the above-mentioned orientation.

It is possible to improve the sensitivity of the impedance detection. This can be done through connecting a second capacitor C2 in parallel with the primary winding L2 of the second transformer TR2, which second capacitor C2 has a value selected to tune the resonance frequency of the second transformer TR2 to the carrier frequency.

It can finally be seen that the first driving stage also comprises a second logical circuit 40 connected to the primary winding of the second transformer TR2, where the second logical circuit 40, which receives the carrier, is an inverter. It inverts the carrier and supplies it to the second transformer TR2.

As can be seen above there is provided communication barrier arrangement, where protection of the isolation barrier is introduced without stopping signal detection. Furthermore, the second driving stage can be made passive, without the requirement of a supply voltage combined with an improved sensitivity in the detection of the second signals.

It should here be realized that several variations are possible.

It is possible that the rectifier and first transformer of the second driving stage are omitted. Moreover, in some instances, the second signals may not be needed. In this case the switch of the second driving stage and the second transformer could be omitted. Naturally also the impedance detector and the second signal conditioner could be omitted from the first driving stage.

Therefore, while the present disclosure has been described with reference to exemplary embodiments, it will be appreciated that the present invention is only limited to the claims.

The invention claimed is:

1. A communication barrier arrangement for connection between a first and a second process control system device, the communication barrier arrangement comprising:
   a first driving stage having a first interface for receiving first signals from the first process control system device that are destined for the second process control system device;
   an isolation barrier comprising a first transformer having a primary winding connected to the first driving stage and a secondary winding, where the first transformer is provided for transfer of the first signals;
   a second driving stage connected to the secondary winding of the first transformer and having a first connection terminal for output of the first signals towards the second process control system device;
   a first signal conditioner having a second connection terminal for receiving the first signals from the second driving stage and a second interface for delivering the first signals to the second process control system device; and
   a protection circuit including a resistor in parallel with a first capacitor, said protection circuit being connected between the first and second connection terminals.

2. The communication barrier arrangement according to claim 1, wherein the signals on the first connection terminal include at least one zero-voltage level and the first signal conditioner is configured to detect such a zero-voltage level and pull the voltage at the second connection terminal to zero in order to discharge the first capacitor.

3. The communication barrier arrangement according to claim 1, wherein a signal connection between the first and second connection terminals that passes through the protection circuit is the only signal connection between the second driving stage and the first signal conditioner.

4. The communication barrier arrangement according to claim 1, wherein the first driving stage is an active driving stage and the second driving stage is a passive driving stage.

5. The communication barrier arrangement according to claim 4, wherein the second driving stage comprises a first transistor with a base or gate connected to the secondary winding of the first transformer, a collector or drain connected to the first connection terminal and an emitter or source connected to ground.

6. The communication barrier arrangement according to claim 1, wherein
   the isolation barrier comprises a second transformer having a primary winding connected to the first driving stage and a secondary winding, where the second transformer is provided for transfer of second signals, the second driving stage is connected to the secondary winding of the second transformer, the second interface of the first signal conditioner is provided for receiving the second signals from the second process control system device destined for the first process control system device, the second connection terminal of the first signal conditioner is provided for transmitting the second signals to the second driving stage, the first connection terminal of the second driving stage is provided for reception of the second signals from the second process control system device, and the first interface of the first driving stage is provided for delivering the second signals to the first process control system device.

7. The communication barrier arrangement according to claim 6, wherein the second driving stage comprises a switch in parallel with the secondary winding of the second transformer, which switch is operated using the second connection terminal.

8. The communication barrier arrangement according to claim 7, wherein a first binary value of the second signals corresponds to a signal level voltage at the second connection terminal and a second binary level of the second signals corresponds to a zero-level voltage at the second connection terminal.

9. The communication barrier arrangement according to claim 7, wherein the switch comprises a second transistor with the drain and source or collector and emitter connected to the secondary winding of the second transformer and the gate or base connected to the first connection terminal.

10. The communication barrier arrangement according to claim 7, wherein the first driving stage comprises an impedance detector connected to the primary winding of the second transformer and a second signal conditioner configured to generate signal pulses recreating said second signals based on the changes in the detected impedance.

11. The communication barrier arrangement according to claim 1, wherein the first driving stage comprises a first coding circuit connected to the primary winding of the first transformer, which first coding circuit is configured to code the first signals into a carrier having a carrier frequency and to convey the carrier with the coded first signals to the signal conditioner via the first transformer, the second driving stage and protection circuit, where the first signal conditioner is configured to extract the first signals from the carrier.

12. The communication barrier arrangement according to claim 11, wherein the coding is a logical combining of the first signals with the carrier.

13. The communication barrier arrangement according to claim 11, wherein the logical combining is an AND or a NOR operation.

14. The communication barrier arrangement according to claim 11, wherein the isolation barrier comprises a second transformer having a primary winding connected to the first driving stage and a secondary winding, where the second transformer is provided for transfer of second signals, the second driving stage is connected to the secondary winding of the second transformer, the second interface of the first signal conditioner is provided for receiving the second signals from the second process control system device destined for the first process control system device, the second connection terminal of the first signal conditioner is provided for transmitting the second signals to the second driving stage, the first connection terminal of the second driving stage is provided for reception of the second signals from the second process control system device, and the first interface of the first driving stage is provided for delivering the second signals to the first process control system device, further comprising a second capacitor connected in parallel with the primary winding of the second transformer, which second capacitor has a value selected to tune the resonance frequency of the second transformer to the carrier frequency.

15. A method of operating a communication barrier arrangement that include an isolation barrier with a first and a second transformer and a protection circuit for the isolation barrier, the protection circuit including a resistor connected in parallel with a first capacitor, the protection circuit having a first side at one end of the parallel components, which first side faces the isolation barrier, and having a second side at an opposite end of the parallel components, the method comprising:

receiving first signals from a first process control system device, transferring the first signals to a second process control system device via the first transformer and the protection circuit, detecting a zero-voltage level at the first side of the protection circuit, and pulling the voltage at the second side of protection circuit to zero in order to discharge the first capacitor.

* * * * *